(12) United States Patent
Oyama et al.

(10) Patent No.: US 7,179,325 B2
(45) Date of Patent: Feb. 20, 2007

(54) HYDROGEN-SELECTIVE SILICA-BASED MEMBRANE

(75) Inventors: Shigeo Ted Oyama, Blacksburg, VA (US); Yunfeng Gu, Blacksburg, VA (US); Doohwan Lee, Taejon (KR)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 284 days.

(21) Appl. No.: 10/775,288

(22) Filed: Feb. 10, 2004

(65) Prior Publication Data

US 2005/0172811 A1 Aug. 11, 2005

(51) Int. Cl.
B01D 53/22 (2006.01)
(52) U.S. Cl. ............................................. 96/11
(58) Field of Classification Search ................ 96/11; 55/524; 427/244; 264/48; 501/12, 127
See application file for complete search history.

(56) References Cited

U.S. PATENT DOCUMENTS

| 4,515,763 A | 5/1985 | Boudart et al. |
| 4,851,206 A | 7/1989 | Boudart et al. |
| 4,865,630 A * | 9/1989 | Abe ............................. 96/11 |
| 4,929,406 A | 5/1990 | Abe et al. |
| 5,200,060 A | 4/1993 | Sajkowski et al. |
| 5,208,190 A | 5/1993 | Anderson et al. |
| 5,444,173 A | 8/1995 | Oyama et al. |
| 6,527,833 B1 | 3/2003 | Oyama et al. |
| 6,854,602 B2 | 2/2005 | Oyama et al. |

OTHER PUBLICATIONS

G. J. Hwang et al.; "Hydrogen separation in $H_2$—$H_2O$—HI gaseous mixture using the silica membrane prepared by chemical vapor deposition"; Journal of Membrane Science, vol. 162 (1999); pp. 83-90.
R. J. R. Uhlhorn et al.; "Synthesis of ceramic membranes"; Journal of Materials Science, vol. 27, No. 2 (1992); pp. 527-537.
V. V. Nazarov et al.; "Synthesis and Colloid-Chemical Properties of Boehmite Hyrolsols"; Colloid Journal, vol. 60, No. 6 (1998); pp. 738-747.
A. Larbot et al.; "Alumina Nanofiltration Membrane From Sol-Gel Process"; Key Engineering Materials, vols. 61 & 62 (1991); pp. 395-398.
C. Lijzenga et al.; "Zirconia-Coated Gamma-Alumina Membrane Toplayers"; Key Engineering Materials, vols. 61 & 62 (1991); pp. 383-386.
R. I. Zakharchenya; "Influence of Peptization on the Properties of Alumina Produced From Boehmite Sols"; Journal of Sol-Gel Science and Technology, vol. 6 (1996); pp. 179-186.
B. E. Yoldas; "Alumina Sol Preparation From Alkoxides"; Ceramic Bulletin, vol. 54, No. 3 (1975); pp. 289-290.
X. Changrong et al.; "Boehmite sol properties and preparation of two-layer alumina membrane by a sol-gel process"; Journal of Membrane Science, vol. 116 (1996); pp. 9-16.
J. S. Masaryk et al.; "Diffusivity of helium in fused silica"; The Journal of Chemical Physics, vol. 59, No. 3 (1973); pp. 1198-1202.
International Search Report for Application No. PCT/US05/03552, dated Apr. 1, 2006.

* cited by examiner

*Primary Examiner*—Robert A. Hopkins
(74) *Attorney, Agent, or Firm*—Conley Rose P.C.

(57) ABSTRACT

A hydrogen permselective membrane, a method of forming a permselective membrane and an apparatus comprising a permselective membrane, a porous substrate and an intermediate layer are described.

18 Claims, 11 Drawing Sheets

Effect of Sol Particle Size a) Larger sol particles

Incomplete
Large b) Smaller sol particles

Cracking  Infiltration c) Graded sol particles

Uniform

Figure 1. Effect of Sol Particle Size
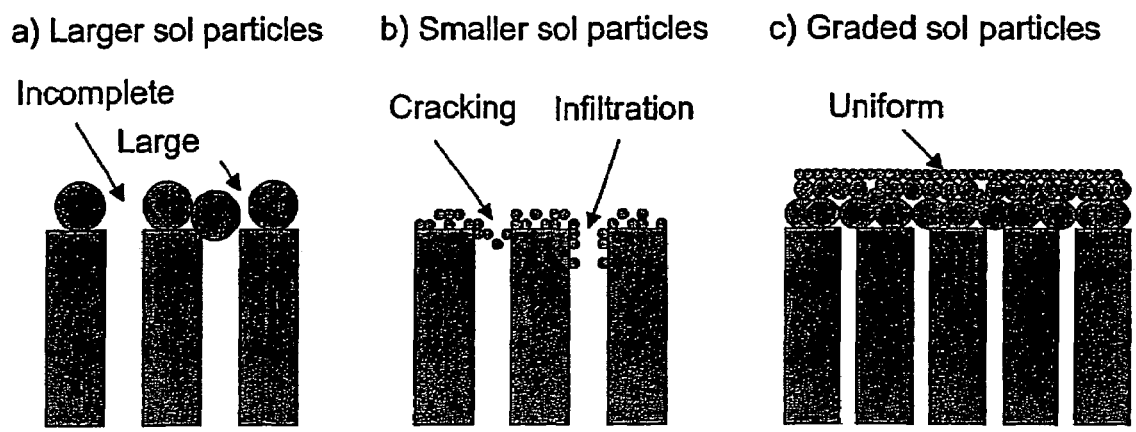
a) Larger sol particles   b) Smaller sol particles   c) Graded sol particles Figure 2. Particle Size Distributions of Boehmite Sols Peptized with Different Acids. Molar ratio of $H^+$/Alkoxide= 0.10
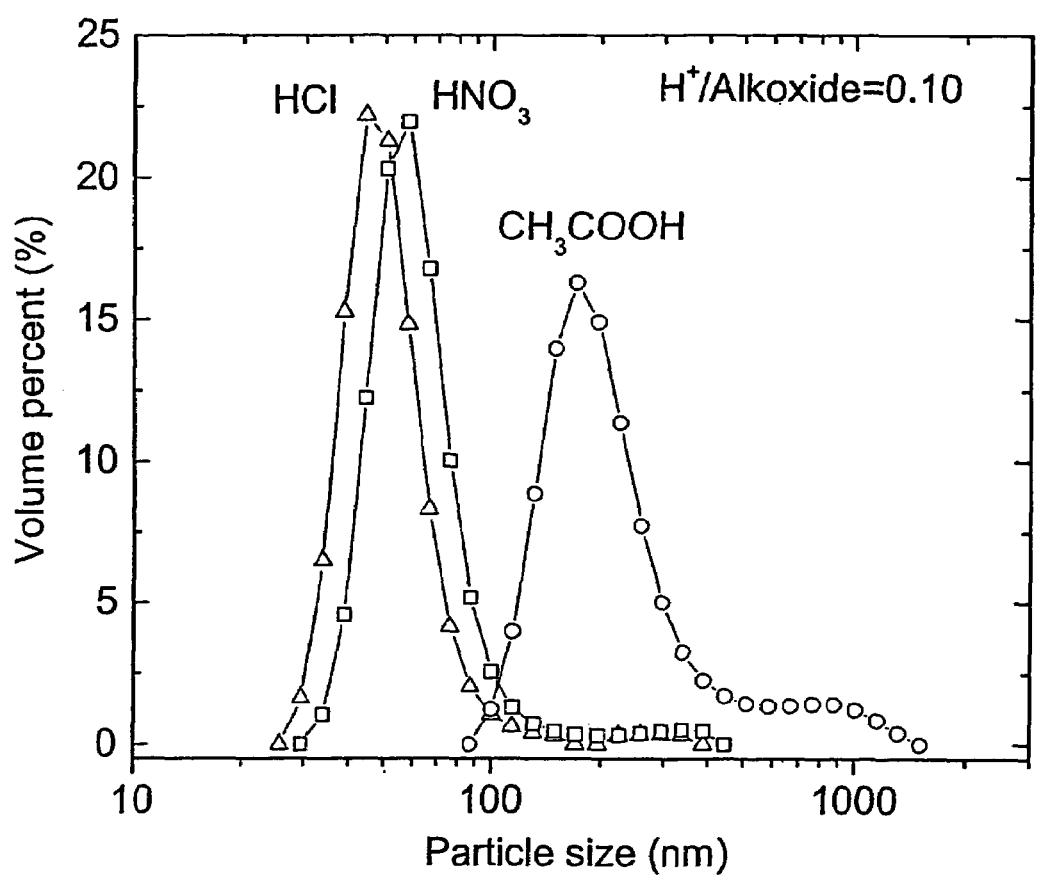

Figure 3. Particle Size Distributions of Boehmite Sols Peptized with Acetic Acid. Molar ratio of $H^+$/Alkoxide are indicted.
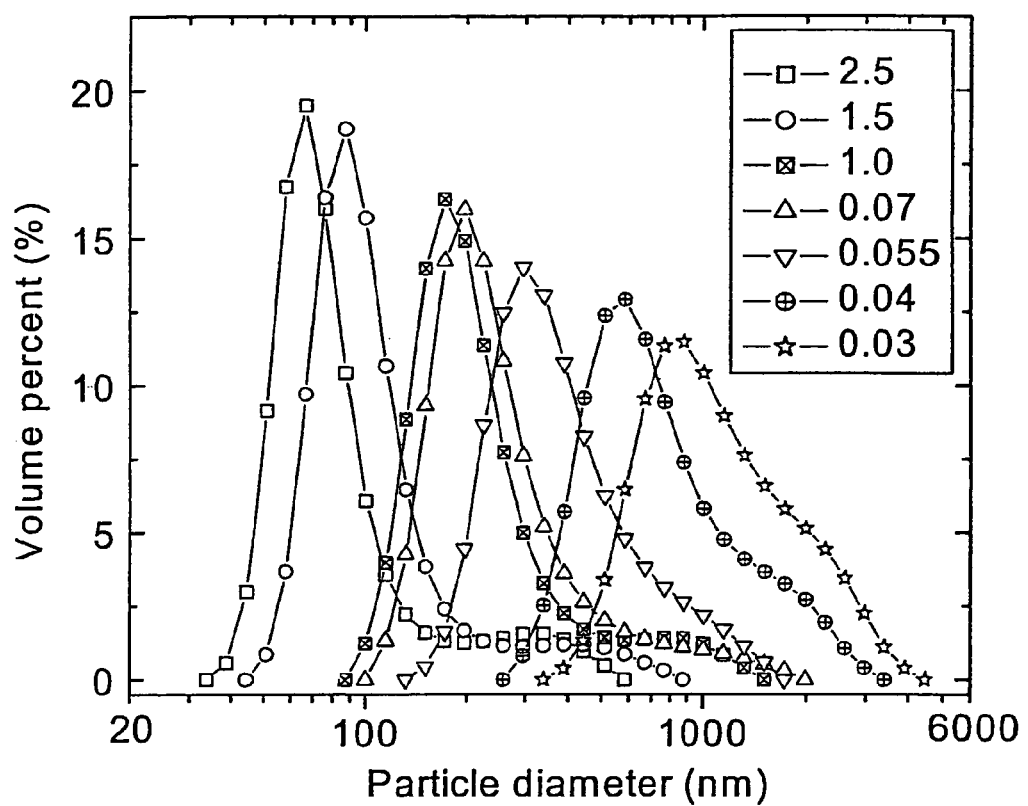

Figure 4. Particle Size Distributions of Boehmite Sols Hydrolyzed for Different Times
Times = 0.5, 3, 24 and 72 h, followed by peptization with acetic acid ($H^+$/Alkoxide=0.15)
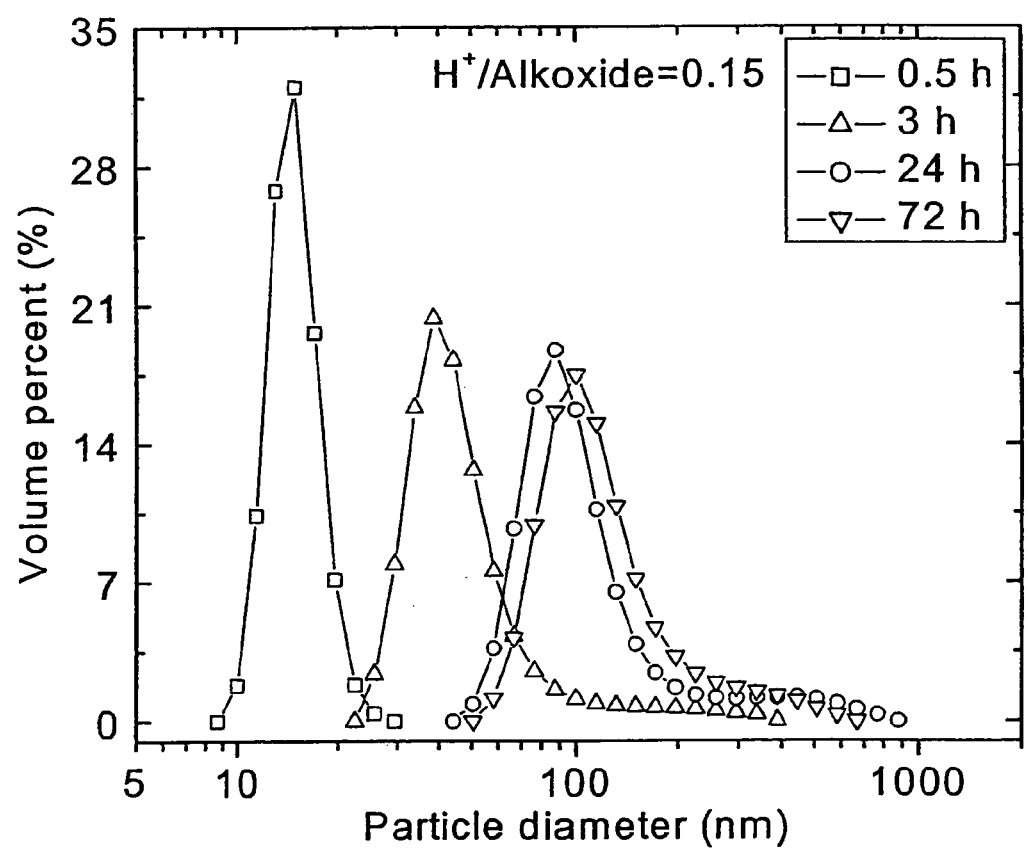

Figure 5. Schematic of Dip-Coating Machine
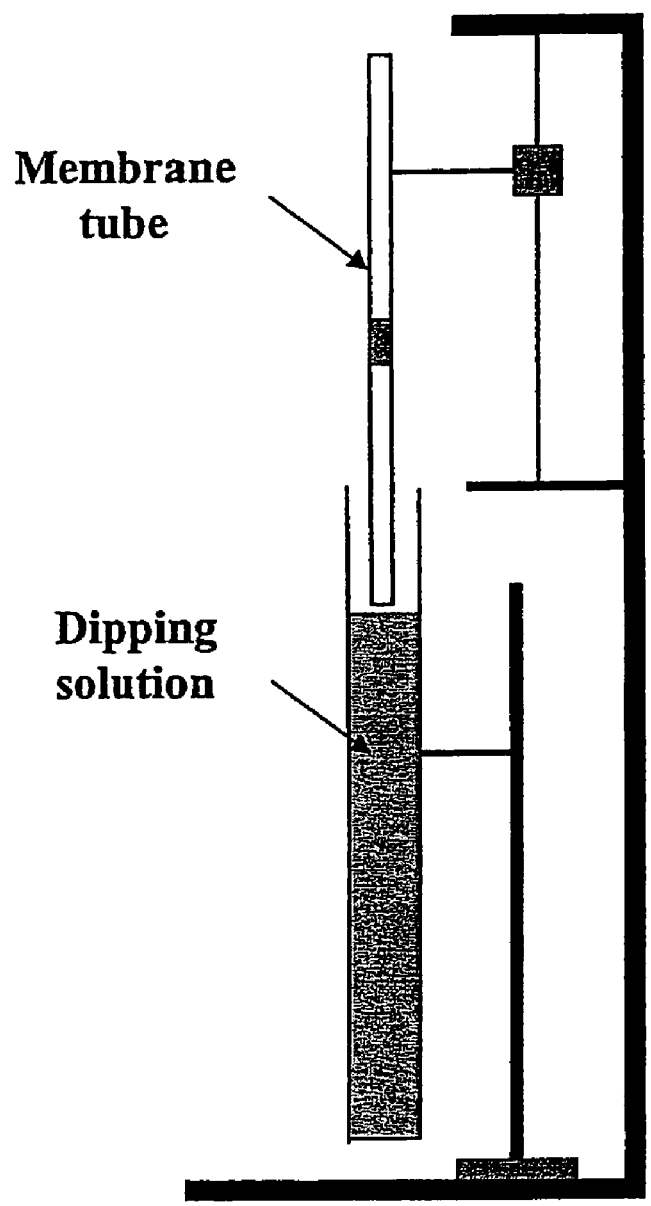

Figure 6. Pore Size Distributions of Gamma-Alumina Supports Obtained from boehmite sols with particle size of 630, 200 and 40 nm
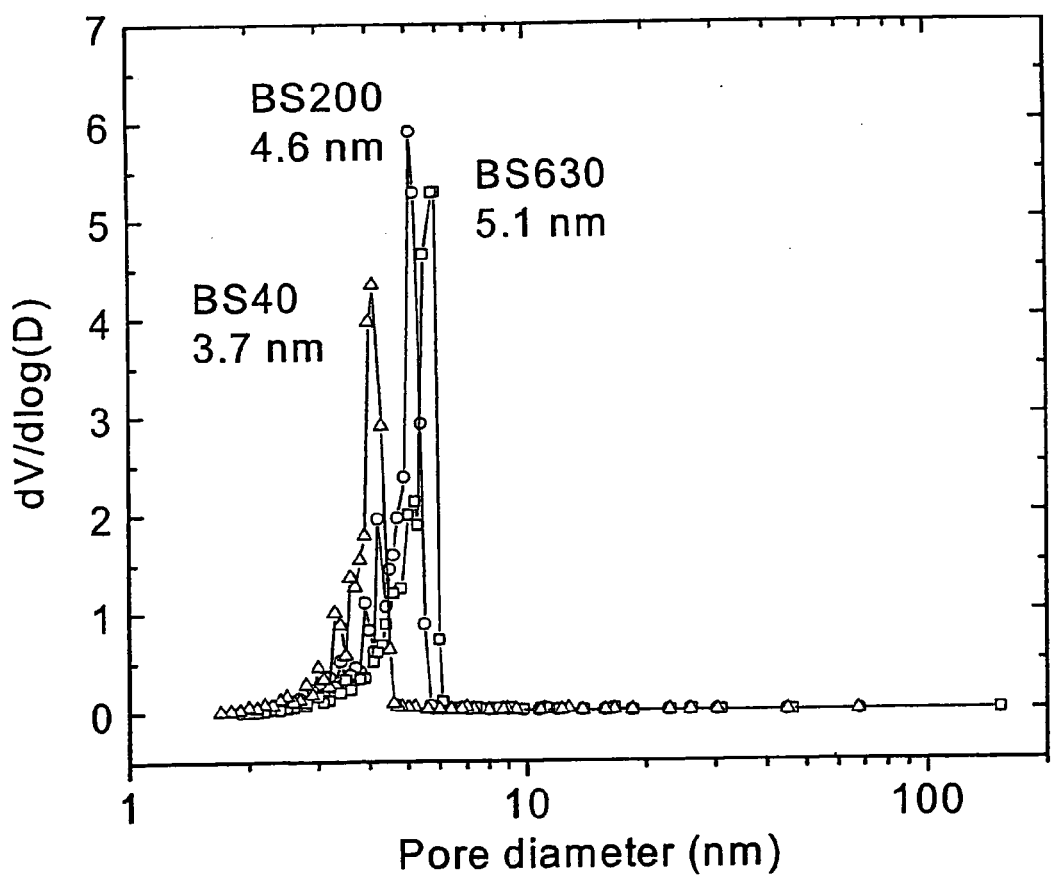

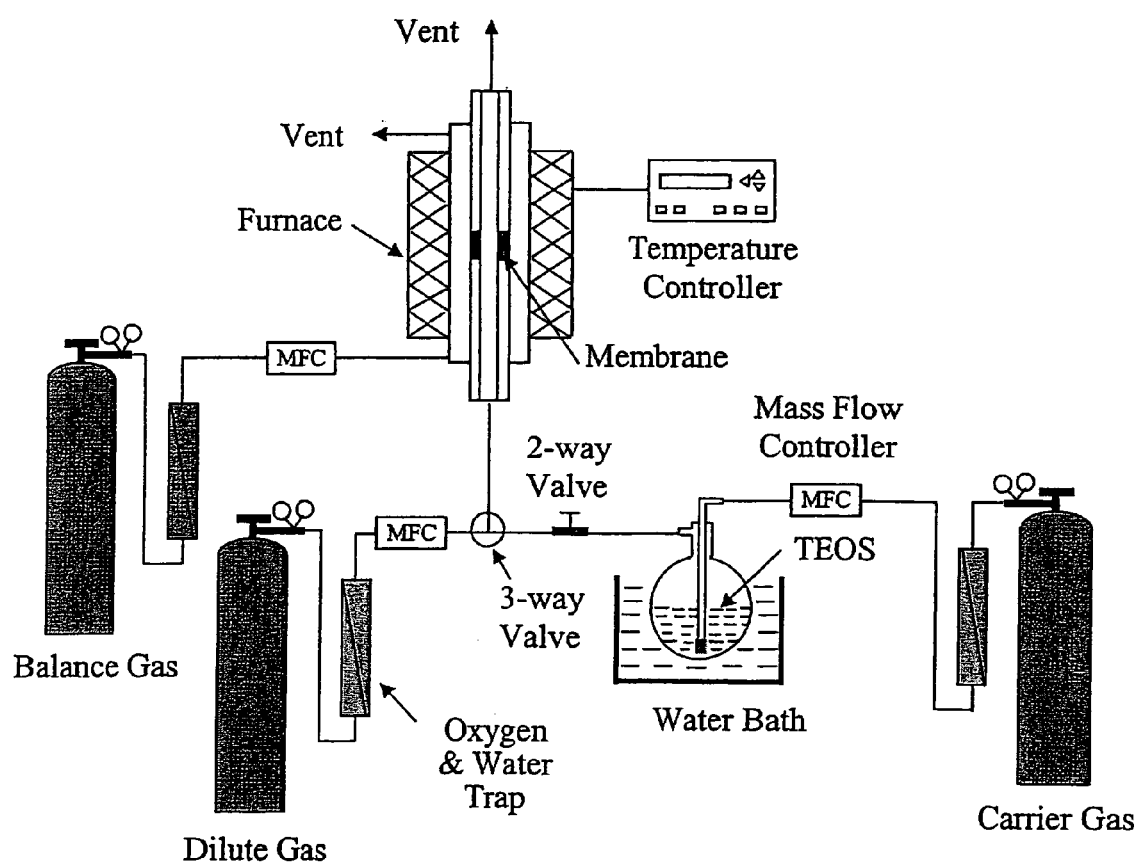
Figure 7. Schematic of CVD Apparatus Used in the Deposition of the Silica Layer Figure 8. Permeation Properties at 873 K of an Ungraded Four-Layer Silica/Alumina Membrane.
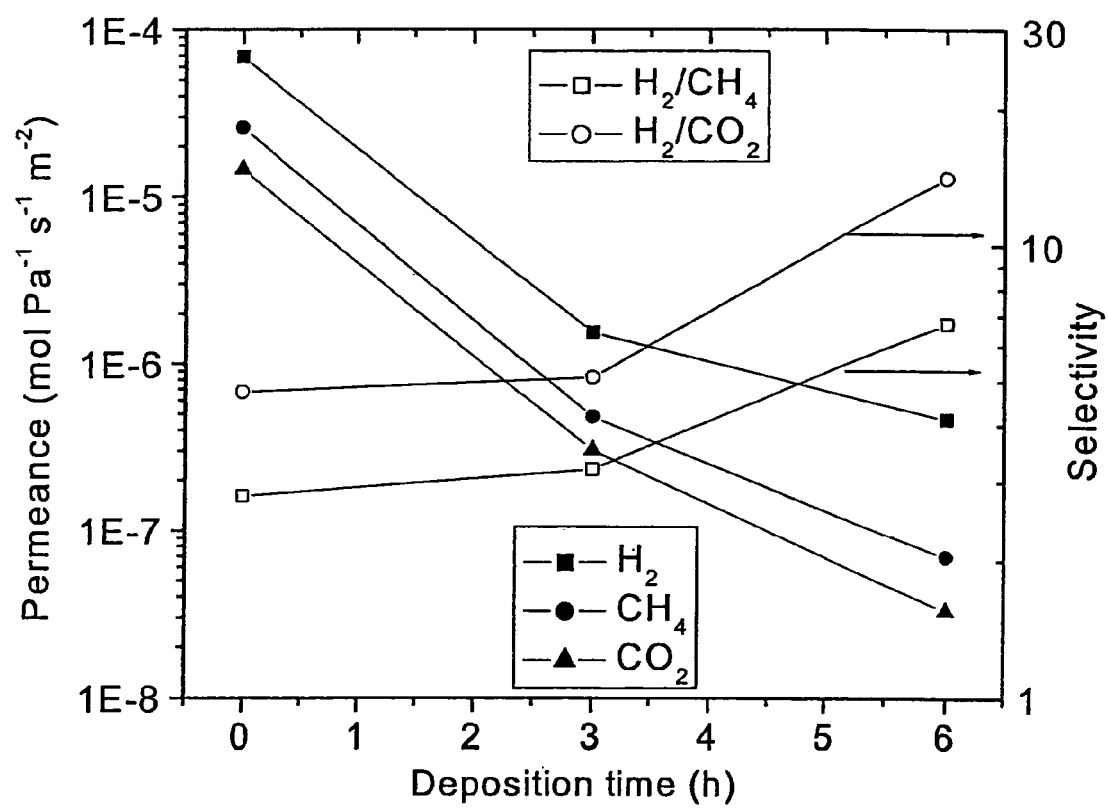

Figure 9. Permeation Properties at 873 K of a Graded Four-Layer Silica/Alumina Membrane.
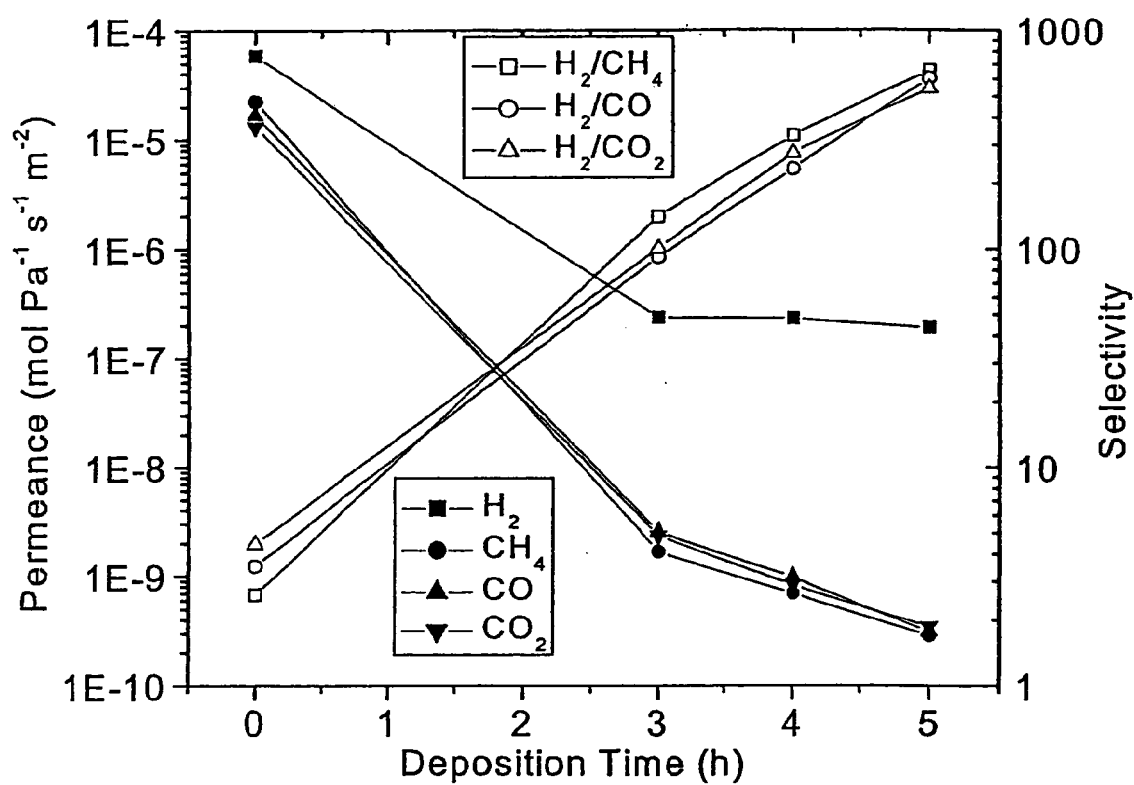

Figure 10. Permeation Properties at 873 K of a Graded Five-Layer Silica/Alumina Membrane.
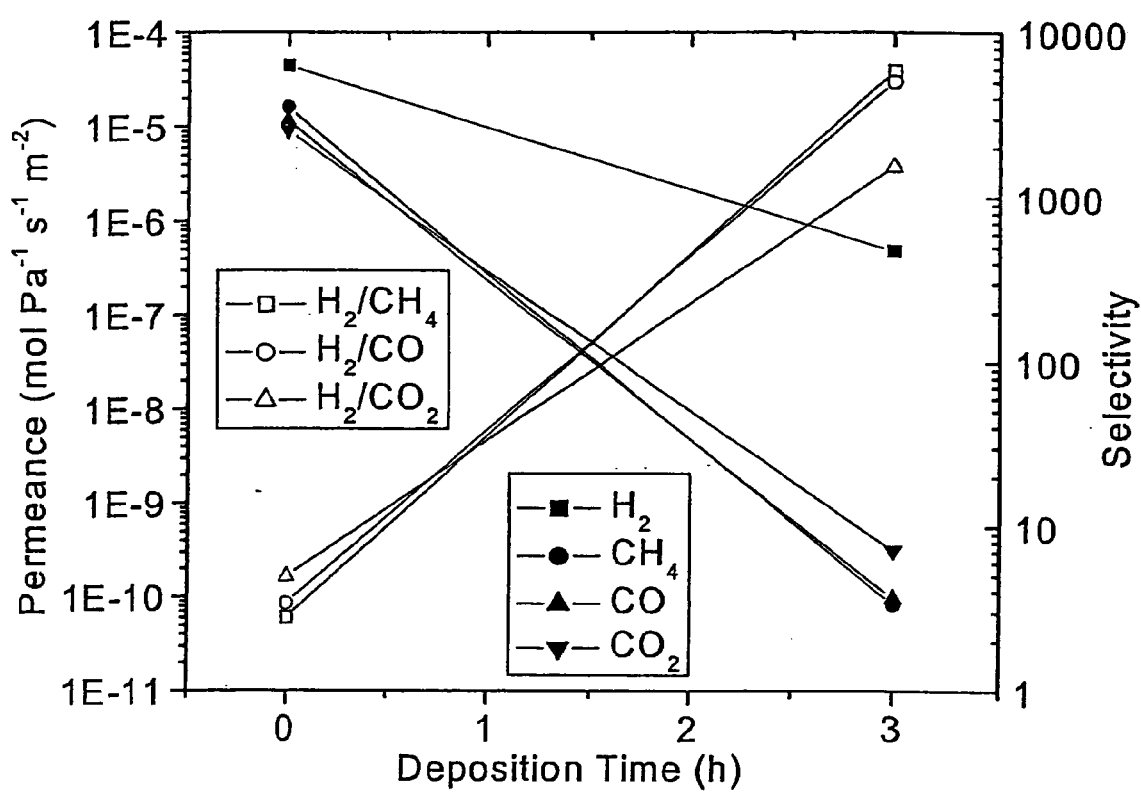

Figure 11. Permeability of He, $H_2$, and Ne through Graded Five-Layer Silica/Alumina Membrane.
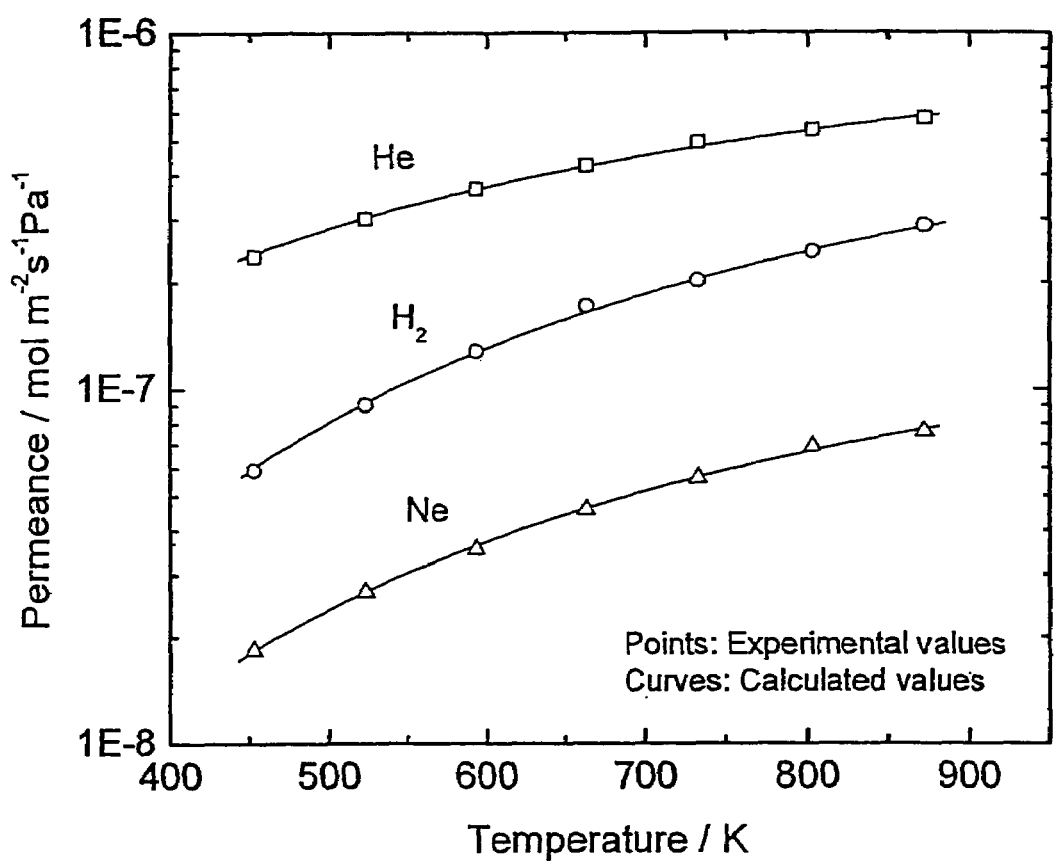

HYDROGEN-SELECTIVE SILICA-BASED MEMBRANE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to inorganic membranes that are permeable to small gas molecules. More particularly, the present invention relates to permeable membranes deposited on porous substrates, having a graded intermediate layer, that exhibit both a high hydrogen permeance and a high hydrogen permselectivity.

2. Description of the Related Art

Permeable materials are those through which gases or liquids may pass. Membranes are one type of permeable material and are composed of thin sheets of natural or synthetic material. Frequently, membranes exhibit different permeances—i.e., permeation rates—for different chemical species. In this regard, permselectivity is the preferred permeation of one chemical species through a membrane with respect to another chemical species. Permselectivity of the desired permeate with respect to another chemical species is calculated as the ratio of the permeance of the desired permeate to the permeance of the other chemical species.

Permselective membranes are promising in a variety of applications including gas separation, electrodialysis, metal recovery, pervaporation and battery separators. Recently, interest has developed in using permselective membranes in so-called membrane reactors, which allow the simultaneous production and selective removal of products. One regime in which permselective membranes are particularly promising is that of equilibrium-limited reactions. In such reactions, yields are reduced by reaction reversibility. Preferential removal of one or more of the reaction products effectively shifts the equilibrium—or, stated differently, decreases the rate of the reverse reaction—thereby overcoming thermodynamic limitations.

One example of an equilibrium limited reaction is the methane dry-reforming reaction [1]:

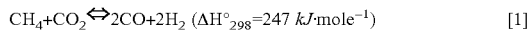

$$CH_4 + CO_2 \Leftrightarrow 2CO + 2H_2 \quad (\Delta H°_{298} = 247 \text{ kJ·mole}^{-1}) \quad [1]$$

This reaction provides a pathway to convert carbon dioxide, a problematic greenhouse gas, and methane, a plentiful natural resource, into synthesis gas—i.e., a mixture of hydrogen and carbon monoxide. Synthesis gas is an industrially important feedstock that is used in the preparation of ethylene glycol, acetic acid, ethylene, fuels and several other commercially important chemicals. Unfortunately, the conversion of methane and carbon dioxide to synthesis gas is limited by the reversibility of the reaction—i.e., the ability of hydrogen and carbon monoxide to regenerate methane and carbon dioxide. The yield can be improved, however, by selectively removing one or both of the products as they are formed. Doing so mitigates the extent of the reverse reaction.

Other examples of equilibrium-limited reactions that produce hydrogen gas are the decomposition of hydrogen sulfide [2] and ammonia [3]:

$$H_2S \Leftrightarrow S(s) + H_2 \quad [2]$$

$$2NH_3 \Leftrightarrow N_2 + 3H_2 \quad [3]$$

Hydrogen sulfide and ammonia are frequent and undesirable byproducts of numerous chemical reactions. Thus, reactions [2] and [3] offer an abatement technique for reducing the levels of these compounds. Like the methane dry-reforming reaction, the products of these reactions can be favored by removing hydrogen as it is produced. In short, hydrogen permselective membranes offer the potential to overcome several equilibrium-limited reactions in commercially useful ways.

Conventional hydrogen permselective membranes have typically been prepared on porous Vycor™ glass or ceramic supports by sol-gel or chemical vapor deposition (CVD) methods. Generally, a thin silica membrane can be directly coated or deposited on mesoporous supports such as Vycor™ glass with 4 nm pore size, but cannot be placed directly on macroporous supports with pore sizes substantially larger than 50 nm. Hwang et al. attempted chemical vapor deposition (CVD) of tetraethylorthosilicate (TEOS) on a porous alumina tube with pore size of 100 nm and obtained only a selectivity of 5.2 for the separation of $H_2$ from $N_2$ at 873 K after 32 hours of deposition (G-J. Hwang, et al., J. Membr. Sci. 162 (1999) 83). Such low selectivities are indicative of the presence of large pore defects.

Coating macroporous supports using an intermediate mesoporous gamma-alumina sol layer prior to the deposition of a silica membrane has been attempted to overcome this problem of large pore defects. However, the quality of the sol layer is limited by, among other things, the size distribution of the sol particles. On the one hand, as depicted in FIG. 1a), when a dipping solution is used consisting of sol particles that are large compared with the pore size of the supports, the particles do not provide additional restrictive passages for controlling selectivity. Additionally, they do not cover the surface uniformly and can leave patches of exposed, untreated surface. On the other hand, as depicted in FIG. 1b), if a dilute dipping solution is used consisting of sol particles that are small compared with the pore size of the supports, these small sol particles do not easily form "bridges" over some of the large features and extra large pores of the supports because of infiltration during dip-coating. Even if such "bridges" are formed, they are not strong and are easily broken or cracked. This problem becomes increasingly more serious for supports with broader pore size distributions.

Previous work in the literature describes a method of depositing a gamma-alumina layer on a support, for example, (R. J. R. Uhlhorn, et al. J. Mater. Sci. 27 (1992) 527). In this work the dipping-calcining procedure is repeated at least 2–3 times by using a concentrated dipping solution with a boehmite sol concentration of 0.5–1.0 M to obtain a thick, defect-free gamma-alumina layer. The layer thickness of a gamma-alumina supported layer, made with 0.6 M dipping solution containing PVA, was typically 5–6 μm after three subsequent dipping steps with 3 second dipping time. Thinner layers are preferred because thicker layers decrease permeability for the desired permeate.

Although Uhlhorn, et al's method has been used in the past, not much attention has been placed on the physical characteristics of these intermediate mesoporous gamma-alumina sol layers. An ideal intermediate layer would be thin, continuous, defect-free and exhibit a high permeability for the desired permeate.

SUMMARY OF THE PREFERRED EMBODIMENTS

The preferred embodiments of the present invention include a method for making permselective asymmetric membranes comprising a porous intermediate layer produced from gamma-alumina sols having a narrow, well-defined particle size distribution. In a preferred embodiment, the sols are mixed in a dilute solution and used to form the porous intermediate layer. Preferably, a plurality of sol solutions are used, whereby sols with increasingly smaller particle size distributions are used to create a graded porous intermediate layer. According to one preferred embodiment, a silica layer is deposited on the gamma-alumina membrane, thereby forming a composite membrane. The preferred embodiments of the present invention also include the permselective asymmetric membranes produced from these methods. The resulting permselective asymmetric membranes preferably show high hydrogen selectivity and permeance.

The preferred embodiments of the present invention include boehmite sols having a narrowly tailored particle size distribution and a method for producing same.

BRIEF DESCRIPTION OF THE DRAWINGS

For a more detailed description of the preferred embodiment of the present invention, reference will now be made to the accompanying drawings, wherein:

FIG. 1a) is a schematic of a support with large sol particles placed thereon;

FIG. 1b) is a schematic of a support with small sol particles placed thereon;

FIG. 2c) is a schematic of a support with graded sol particles placed thereon, forming a uniform substrate layer, in accordance with a preferred embodiment;

FIG. 2 is graph of particle size distributions of boehmite sols peptized with various acids;

FIG. 3 is a graph of particle size distributions of boehmite sols peptized with acetic acid;

FIG. 4 is a graph of particle size distributions of boehmite sols hydrolyzed for various times;

FIG. 5 is a schematic of dip-coating machine for use in accordance with a preferred embodiment;

FIG. 6 is a graph of pore size distributions of gamma-alumina supports obtained from boehmite sols having various particle sizes;

FIG. 7 is a schematic of a suitable CVD apparatus for use in the deposition of the silica layer;

FIG. 8 is a graph of permeation properties at 873 K of an ungraded four layer silica/alumina membrane;

FIG. 9 is a graph of permeation properties at 873 K of a graded four layer silica/alumina membrane in accordance with a preferred embodiment;

FIG. 10 is a graph of permeation properties at 873 K of a graded five layer silica/alumina membrane in accordance with a preferred embodiment;

FIG. 11 is a graph of permeability of He, $H_2$, and Ne through a graded five-layer silica/alumina membrane in accordance with a preferred embodiment;

DETAILED DESCRIPTION OF THE PREFERRED EMBODIMENTS

The present invention derives, in part, from the discovery that thin, high quality films with high permeance can be deposited on porous substrates using dilute sols of sequentially smaller particle size distribution. These films can be used as intermediate layers between a porous support and a membrane material to create asymmetric membranes exhibiting a combination of high hydrogen permeability and selectivity.

According to one preferred embodiment of the present invention, a porous support is dip-coated with a series of boehmite sols having sequentially decreasing particle size distributions. As depicted in FIG. 1c, this gives rise to a graded structure with satisfactory filling of voids, thereby avoiding (or at least minimizing) defects. In order to accomplish this task, sols having controlled particles size distributions are needed.

Boehmite sols are poorly understood (V. V. Nazarov and O. B. Pavlova-Verevkina, Colloid Journal, 60 (1998) 738). The published data on the relationship between the particle size distribution of boehmite sols and process parameters are very limited and contradictory to some extent, even when the same measuring techniques are used. For example, in a case where the same aluminum precursor and peptization agent were used for synthesis, and the same quasi-elastic light scattering technique was employed for analysis, Larbot et al. (A. Larbot, et al., Key Eng. Mater., 61–62 (1991) 395) reported the median particle size of a boehmite sol increasing from 100 to 250 nm with the pH value increasing from 3.4 to 4.2, while Xia et al. (C. Xia, et al. J. Membr. Sci. 116 (1996) 9) found the sol particle size decreasing considerably from 470 nm to 144 nm and then slightly increasing to 228 nm with an increase of pH from 3.22 to 4.42. Lijzenga et al. (C. Lijenga, et al., Key Eng. Mater., 61–62 (1991) 383) obtained a boehmite sol with a particle size in the range of 40–60 nm at a pH between 4 and 5. Zakharchenya (R. I. Zakharchenya, J. Sol-Gel Sci. & Tech. 6 (1996) 179) reported that the average particle sizes of the boehmite sols were always in the interval of 20±15 nm when different aluminum precursors, peptization acids and molar ratio of $H^+$/Alkoxide in the range of 0.01–0.3 were employed. *Yoldas* (B. E. Yoldas, Ceram. Bull. 54 (3) (1975) 289) prepared aluminum sols by the hydrolysis of aluminum alkoxide precursors in various acid solutions and found that when HCl was used mean particle size increased from 5–35 nm to 10–100 nm with increasing acid concentration.

The preferred embodiments of the present invention include methods for preparing sols, preferably alumina sols, having tailored median particle sizes with narrow particle size distributions as well as methods for applying the sols as a mesoporous layer, preferably a mesoporous gamma-alumina layer, onto macroporous supports. The following preferred embodiments for obtaining these sols are exemplary and are not intended to be limiting.

Preparation of the Sols

A quantity of 0.2 mol of aluminum isopropoxide was added to 300 ml of distilled water at room temperature. The mixture was quickly heated to 353 K within 0.5 hours with high speed stirring [~500 rpm] and was maintained at this temperature for 24 hours, allowing hydrolysis of the isopropoxide, forming a precipitate. The precipitate was then heated to 365 K and peptized using a predetermined quantity of acid. Various acids were used, including acetic acid, nitric acid, hydrochloric acid. The solution was kept at 365 K with refluxing for 20 hours to get a stable sol. A stable sol is herein defined as a sol that retains its particle size for three months to within 5% of its original particle size.

For some embodiments, the aluminum isopropoxide was hydrolyzed at 353 for 24 hours and then peptized using acetic acid, nitric acid and/or hydrochloric acid, using a molar ratio of $H^+$/Alkoxide=0.10(FIG. 2). It should be understood that the $H^+$ refers to the total normal equivalents of $H^+$ and not the hydronium ion concentration taking into account the Ka of the acid. For other embodiments, the aluminum isopropoxide was hydrolyzed at 353 K for 24 hours and then peptized using acetic acid using different molar ratios of $H^+$/Alkoxide in the range of 0.03–0.25 (FIG. 3). In still other embodiments, the aluminum isopropoxide was hydrolyzed at 353 K for 0.5, 3, 24 and 72 hours, and then peptized using acetic acid with a molar ratio of $H^+$/Alkoxide=0.15 (FIG. 4). These sols characterized in FIGS. 2–4 remained stable for more than 3 months.

A dynamic light scattering analyzer (Horiba Model LB-500) was used to measure the particle size distribution of the sols. The concentration of the sols obtained in each of FIGS. 2–4 was in the range of 0.75–0.85 M, and the exact sol concentration was obtained by measuring the volume of the sol. As can be appreciated from comparing FIGS. 2–4, stable boehmite sols with particle sizes in the range of 10–1000 nm were produced by controlling the sol-gel process parameters such as acid type, acid concentration and hydrolysis time.

The procedures provided above are given as a general description and do not limit the invention in so far as the quantity and type of aluminum precursor, which may be any hydrolyzable species or combination thereof including but not limited to aluminum methoxide, ethoxide, propoxide, isopropoxide, butoxide, or aluminum chloride. The acid may be any inorganic acid or combination thereof including but not limited to nitric acid, hydrochloric acid, or perchloric acid, or any organic acid or combination thereof including but not limited to formic acid, acetic acid, propionic acid, benzoic acid, etc. Furthermore, the acid may be a combination of organic and inorganic acids. Additionally, times and temperatures of hydrolysis, peptizing, and aging may deviate considerably from the above-described general method.

Preparation of the Intermediate Sol Layer

The preferred embodiments of the present invention employed commercial alumina membrane tubes (PALL Corporation, Membralox® TI-70-25Z Membrane Tube, I.D.=7 mm, O.D.=10 mm) with a nominal pore size of 100 nm were used as the support. The membrane tubes were cut into short pieces approximately 3 cm in length, washed with hot water to remove alumina particles, and connected with non-porous alumina tubes (Degussit/Pascal, http://www.pascal-co-ltd-.co.jp/PDFcatalog/D1.pdf) at both ends with ceramic joints. The ceramic joints were made with a glaze (Duncan IN 1001) fired at 1153 K for 0.5 hours.

Dilute dipping solutions were prepared by mixing the previously described boehmite sols with an aqueous PVA solution of concentration of 3.5 wt % and diluting with enough distilled water to form 0.15 M concentrations (Al content) of the sol.

The alumina support was dipped into the dipping solution and withdrawn after 10 seconds at a rate of 0.01 meter/second using a dip-coating machine, as shown in FIG. 5. The dip-coated alumina support was dried in ambient air for 24 hours, and then placed in a furnace connected with a temperature controller. The support was heated to 923 K in air at a rate of 1 K/minute and calcined in air at 923 K for 2 hours. As described further below, the dipping-calcining process was repeated 3–5 times per support using either a single sol or a series of sols having sequentially smaller average particle sizes to form a uniform membrane substrate.

EXAMPLES OVERVIEW

In the following examples, four boehmite sols prepared in accordance with the above methods having median particle sizes of 630, 200, 55 and 40 nm were used to prepare mesoporous gamma-alumina layers on porous supports according to the above procedures. For each of the supports, the diameter of the pores was much larger than molecular sizes (~0.2 nm) and the untreated supports did not provide selectivity for hydrogen or other gases.

In a first comparative example, a gamma-alumina layer was prepared on a 100 nm pore size alumina support by dipping-calcining the alumina four times in the same sol containing particles of size 55 nm. In another comparative example, a gamma-alumina layer was prepared on a 100 nm pore size alumina support by dipping-calcining the alumina four times in the same sol of particle size 630 nm. In another example, a gamma-alumina layer was prepared on a 100 nm pore size alumina support by dipping-calcining the alumina successively in sols in the order of decreasing particle size: 630, 630, 200 and 40 µm. In another example, a gamma-alumina layer was prepared on a 100 nm pore size alumina support by dipping-calcining the alumina in sols of decreasing particle size: 630, 630, 200, 40 and 40 nm.

The microstructures of the gamma-alumina layers were characterized by nitrogen physisorption conducted in a volumetric unit (Micromeritics ASAP 2000). The alumina layer samples were prepared using the same procedure and parameters as the supported membranes. First, a boehmite sol was cast on a glass Petri dish and dried at ambient temperature in air. The dried gel flakes were recovered from the bottom of the Petri dish, and were then heated to 923 K in air at a rate of 1 K/minute and maintained at this temperature for 2 hours.

The Barrett, Joyner and Halenda (BJH) method was used to determine the pore size distribution using the desorption isotherm. FIG. 6 illustrates the pore size distributions of the gamma-alumina supports prepared from the boehmite sols containing particles of size of 630, 200, and 40 nm. These supports had a sharp pore size distribution. Additionally, Table 1 lists the microstructure parameters of these three supports. It was discovered that the larger the particle size of the sols, the larger the pore size and porosity of the resulting membranes, as discussed in connection with FIG. 1.

TABLE 1

Microstructure parameters of gamma-alumina membranes

| | Gamma-alumina membrane | | | |
|---|---|---|---|---|
| Sol particle size (nm) | Pore volume ($cm^3 g^{-1}$) | Pore surface area ($m^3 g^{-1}$) | Average pore size (nm) | Porosity* (%) |
| 630 | 0.4731 | 370.4 | 5.11 | 63.6 |
| 200 | 0.4321 | 378.7 | 4.56 | 61.5 |
| 40 | 0.3622 | 388.6 | 3.73 | 57.3 |

*$\rho_{gamma-alumina}$ = 3.7 g $cm^{-3}$ (R. S. A. de Lange et al., J. Membr. Sci., 99 (1995) 57)

Silica layers were deposited on the previously described gamma-alumina layers by a chemical vapor deposition (CVD) method described by Oyama et al. in U.S. Pat. No. 6,527,833, incorporated herein by reference. The Oyama et al. method places a silica layer on a support via thermal decomposition of tetraethylorthosilicate (TEOS) at high temperature in the absence of oxygen. While silica/alumina composite membranes are discussed, any suitable membrane materials may be used including, but are not limited to, alumina, zirconia, titania, silicon nitride, silicon carbide, boron nitride, perovskites, spinels, pyrochlores, zeolites, metals and the like. Additionally, any acceptable silica-containing species may be substituted for TEOS A suitable CVD apparatus is shown in FIG. 7 and CVD process parameters are listed in Table 2. Briefly, the reactor assembly 210 for depositing the permselective membrane on the porous substrate 220 comprises an outer concentric, nonporous tubing 230 and a temperature-controlled heater 250. The porous substrate 220 is surrounded by outer concentric, nonporous tubing 203 of larger diameter, forming an annulus (not shown). The inside of the porous tubing 220 is referred to herein as the "tube" side 262 whereas the outside of the porous tubing 220 that is located inside the outer concentric, nonporous tubing 230 is referred to as the "shell" side 264. The concentric tubing 220 and outer concentric, nonporous tubing 230 are located in temperature-eater controlled heater 250.

A CVD reactant gas is generated by a gas dilution system 310 as depicted in FIG. 7. As used herein, the term CVD reactant gas refers to the gas or gases being deposited in the CVD process. As used herein, the term CVD gas stream refers to the CVD reactant gas as well as any associated inert carrier gases.

Referring still to FIG. 7, carrier gas from carrier gas cylinder 320 passes through a temperature-controlled bubbler 330 containing the liquid CVD material 334. In some embodiments, the carrier gas passes through an oxygen-water trap 322 prior to entering temperature-controlled bubbler 330. The carrier gas saturated with CVD reactant gas then flows through a tee 340, in which it is mixed with dilution gas flowing from a dilution gas cylinder 350. In some embodiments, the carrier gas saturated with CVD reactant gas passes through an oxygen-water trap 342 prior to mixing in dilution gas cylinder 350. The mixed gas stream containing the CVD reactant gas, carrier gas and dilution gas then passes into the upstream end 272 of the tube side of the porous tubing, through the porous tubing, and out the downstream end 274 of the tube side of the porous tubing. The concentration of the CVD reactant gas in the CVD gas stream can be varied considerably and accurately by adjusting the temperature of the bubbler 330 as well as the mass flow controllers 312 located downstream of the carrier gas cylinder 320 and the dilution gas cylinder 350.

The environment surrounding the exterior of the porous tubing 220—i.e., the shell side 264—is controlled using either a purge gas or a vacuum. When a purge gas is used, the purge gas from purge gas cylinder 360 enters through a gas inlet 232 in the outer concentric, nonporous tubing 230 and passes out through a gas vent 234 located at the other end of the an outer concentric, nonporous tubing 230. In some embodiments, the purge gas passes through an oxygen-water trap 352 prior to entering nonporous tubing 230. Alternatively, the environment surrounding the exterior of the porous tubing 220 can be evacuated using a vacuum pump (not shown). This is accomplished by connecting a vacuum pump to gas vent 234 and closing the valve just downstream of purge gas cylinder 360, thereby establishing an airtight seal.

For the examples, the support covered with the gamma-alumina layers was installed concentrically inside a piece of glass tubing of 14 mm inside diameter (nonporous tubing 230) using machined Swagelok fittings with Teflon ferrules. After placing the assembly in an electrical furnace (temperature controller 250) and heating it to 873 K at a heating rate of 1 K/minute, an argon gas flow (balance gas from gas cylinder 360) was introduced on outer shell side 264 and a dilute argon gas flow (dilute gas from gas cylinder 350) was introduced on the inner tube side 262. After 30 minutes a carrier gas flow (carrier gas from gas cylinder 320) was passed through bubbler 330 filled with TEOS (liquid CVD material 334) at 296 K and was premixed with the dilute argon gas flow before introduction to the inside of the support. The deposition time was varied from 3 to 6 hours. After the CVD process was finished, assembly 210 was purged with the balance and dilute gas flows for 30 minutes.

The gas permeation measurement was generally conducted at 873 K on $H_2$, $CH_4$, CO and $CO_2$ by admitting the pure gases at a certain pressure (higher than atmospheric pressure) into the inner tube side, one end of which was closed, and measuring the quantity of gas flowing from the outer tube. The selectivity was calculated as the ratio of the permeances of $H_2$ to $CH_4$, CO and $CO_2$. Permeation of He, $H_2$, and Ne was measured in a similar manner at different temperatures.

TABLE 2

| CVD process parameters for the preparation of composite membranes | |
|---|---|
| Carrier gas flow rate (ml min$^{-1}$) | 5.4 |
| Dilute gas flow rate (ml min$^{-1}$) | 19.6 |
| Balance gas flow rate (ml min$^{-1}$) | 25.0 |
| TEOS concentration (mol m$^{-3}$) | 0.0193 |
| CVD temperature (K) | 873 |

Example 1

This example and the following two examples describe the synthesis of boehmite sols in accordance with a preferred embodiment. It should be noted that the dipping solutions, consisting of the described sols are dilute, not gels. The use of dilute solutions gives rise to thin intermediate layers.

A boehmite sol was prepared by adding 0.2 mol of aluminum isopropoxide (Aldrich, 98+%) to 300 ml of distilled water at room temperature. The mixture was stirred at high speed and heated to 353 K within 30 min. The alkoxide was hydrolyzed at this temperature for 24 hours, and then the temperature of the mixture was increased to 365 K, after which the flask was opened for 1.5 hours to allow volatilization of the alcohol. The flask was then closed again and the solution was stirred at 365 K for 1 hour with refluxing. A predetermined quantity of nitric acid (VWR, 68.0–70.0%), hydrochloric acid (GR, 36.5–38.0%) or acetic acid (GR, 99.7%) was added to the solution to give a 0.10 molar ratio of H$^+$/Alkoxide. After peptization at 365 K with refluxing for 20 hours, a clear and stable sol solution was obtained.

FIG. 2 shows the particle size distributions of the three boehmite sol solutions obtained with the corresponding acids. It can be seen that the sols prepared with inorganic acids have smaller average particles sizes than the sols prepared with acetic acid. The boehmite sol peptized with nitric acid was found to have a median particle size of 55 nm and was designated BS55. BS55 was used for the preparation of the intermediate layers of gamma-alumina in membrane substrates, later described.

Example 2

Boehmite sols were prepared using the method described in Example 1, except the hydrolyzed solution was peptized with various quantities of acetic acid to give molar ratios of $H^+$/Alkoxide of 0.03, 0.04, 0.055, 0.07, 0.10, 0.15 and 0.25. FIG. 3 shows the particle size distributions in these seven boehmite sol solutions. When acetic acid was used as the peptizing agent, the median particle size of the resulting boehmite sols increased from 65 nm to 950 nm with decreasing molar ratio of $H^+$/Alkoxide from 0.25 to 0.03. Thus, lower acetic acid concentration tends to favor the formation of larger particles. The two boehmite sols which were peptized with acetic acid at molar ratios of $H^+$/Alkoxide of 0.04 and 0.07, and which had median particle sizes of 630 and 200 nm, respectively, were designated as BS630 and BS200. BS630 and BS200 were also used for the preparation of the intermediate layers of gamma-alumina in membrane substrates, later described.

Example 3

Boehmite sols were prepared using the method described in Example 1, except the aluminum isopropoxide was hydrolyzed at 353 K for various times (0.5, 3, 24 and 72 hours) and the solution was peptized for 20 hours with acetic acid at a molar ratio of $H^+$/Alkoxide of 0.15. FIG. 4 shows the particle size distributions in these boehmite sol solutions. As the hydrolysis time increased from 0.5 hours to 72 h, the median particle size of the resulting boehmite sols increased from 13 nm to 120 nm. The boehmite sol which was hydrolyzed at 353 K for 3 hours and peptized with acetic acid at a molar ratio of $H^+$/Alkoxide of 0.15 and which had a median particle size of 40 nm was designated as BS40. BS40 was used for the preparation of the immediate layers of gamma-alumina in membrane substrates, later described.

Example 4

This example describes the preparation of dipping solutions used in the dipping-calcining procedure for placing alumina layers on top of a porous substrate. The dipping solutions are diluted combinations of the sol solutions described in Examples 1–3 mixed with a binding agent or binder, polyvinyl alcohol (PVA). It is contemplated that other suitable binders include, but are not limited to, polysaccharide, starch, stearic acid, polylactic acid, polymethylmethacrylate, polysulfone, polyimide, or any polymer or polyelectrolyte-containing polar groups.

Several dipping solutions with sol concentrations of 0.15 M were prepared. The dipping solution made using the boehmite sol BS55 with median particle size of 55 nm described in Example 1 was designated as DS55. DS55 was prepared by adding 3.5 g of PVA (Fluka, M.W.=72,000) and 5 ml of 1 M $HNO_3$ into 95 ml of boiling water with vigorous stirring and refluxing. After 4 hours, a clear solution with a PVA concentration of 3.5 weight percent was obtained. Then, 37.5 ml of 0.80 M boehmite sol BS55 was vigorously mixed with 142 ml of distilled water and 20 ml of the 3.5 weight percent PVA solution at above 323 K for 2 hours with refluxing. The final concentrations of PVA and boehmite in the sol were 0.35 weight percent and 0.15 M, respectively. The solution was cooled to room temperature for 1 hour without stirring and was set aside for the preparation of the gamma-alumina membranes.

Dipping solutions DS630, DS200 and DS40 were obtained by the same procedure using the boehmite sols BS630, BS200 and BS40 described in Examples 2 and 3. These boehmite sols had median particle sizes of 630, 200 and 40 nm, respectively.

Example 5

This comparative example describes the preparation of ungraded membrane substrates by the deposition of intermediate gamma-alumina layers on top of a porous support, where the layers are formed from a single dipping solution. The support used was a commercial alumina membrane tube, 3 cm long with a nominal pore size of 100 nm.

A dip-coating method was employed to coat the alumina supports with the sol and binder materials. First, dipping solution DS55 containing the boehmite sol with median particle size of 55 nm described in Example 4 was used. The support was dipped at a speed of 0.01 meter/second in dipping solution DS55, was held for 10 seconds, and was withdrawn at the same speed. The sol-coated tube was dried in ambient air for 24 h, heated up to 923 K at a heating rate of 1 K/minute and calcined for 2 hours. This dipping-calcining procedure was repeated 4 times and the resulting membrane substrate was designated as membrane substrate 55-55-55-55. The permeation properties of membrane substrate 55-55-55-55 are listed in Table 3.

A similar procedure was used to prepare a membrane substrate using dipping solution DS630. This was designated membrane substrate 630-630-630-630. The permeation properties of membrane substrate 630-630-630-630 are shown in FIG. 8 and are listed in Table 3.

TABLE 3

| Permeation properties of Example 5 | | | |
|---|---|---|---|
| Permeation properties | | Membrane substrate 55-55-55-55 | Membrane substrate 630-630-630-630 |
| Permeance ($mol/m^2$ s Pa) | $H_2$ | $4.8 \times 10^{-5}$ | $6.9 \times 10^{-5}$ |
| | $CH_4$ | $1.8 \times 10^{-5}$ | $2.6 \times 10^{-5}$ |
| | $CO_2$ | $1.1 \times 10^{-5}$ | $1.5 \times 10^{-5}$ |
| Selectivity | $H_2/CH_4$ | 2.7 | 2.7 |
| | $H_2/CO_2$ | 4.4 | 4.6 |

Example 6

This example describes the preparation of graded membrane substrates for the formation of composite membranes. The membrane substrates were made by the deposition of intermediate gamma-alumina layers on top of a porous support, where the layers were formed from dipping solutions having sequentially smaller average particle sizes. In some embodiments, the dipping-calcining steps were repeated.

The same method was used as in Example 5, except the four dipping-calcining steps were carried out with different 0.15 M dipping solutions in the order DS630, DS630, DS200 and DS40. As described in Example 4, the solutions DS630, DS200 and DS40 contained the sols with median particle sizes of 630, 200 and 40 nm, respectively. First, the support was dipped in the dipping solution DS630, dried and then calcined as described in Example 5. Then, the dipping-calcining procedure was repeated using the same dipping solution DS630, followed by application of the dipping-calcining procedure with solutions DS200, and DS40. This membrane substrate was designated membrane substrate

630-630-200-40. The pore size distribution of membrane substrate 630-630-200-40 is given in FIG. 6 and the permeation properties are listed in Table 4.

The same procedure was followed to deposit five layers in the order DS630, DS630, DS200, DS40 and DS40. The resulting membrane substrate was designated membrane substrate 630-630-200-40-40 and its permeation properties are also listed in Table 4.

TABLE 4

Permeation properties of Example 6

| Permeation properties | | Membrane substrate 630-630-200-40 | Membrane substrate 630-630-200-40-40 |
|---|---|---|---|
| Permeance (mol/m² s Pa) | $H_2$ | $5.9 \times 10^{-5}$ | $4.5 \times 10^{-5}$ |
| | $CH_4$ | $2.2 \times 10^{-5}$ | $1.6 \times 10^{-5}$ |
| | $CO_2$ | $1.3 \times 10^{-5}$ | $9.1 \times 10^{-6}$ |
| Selectivity | $H_2/CH_4$ | 2.7 | 2.8 |
| | $H_2/CO_2$ | 4.5 | 4.9 |

Example 7

This comparative example describes the preparation of composite silica/alumina membranes employing ungraded membrane supports as substrates. The composite membranes consist of thin silica layers deposited by CVD on top of the sol-treated substrates obtained in Example 5 (i.e. 55-55-55-55 and 630-630-630-630). The silica layer was deposited by the C TEOS at high temperature as described in U.S. Pat. No. 6,527,833 and in the "Examples Overview" section.

The CVD process was conducted for 3 hours and 6 hours with the apparatus shown in FIG. 7 and the process parameters listed in Table 2. The permeation properties of the resulting composite membranes at 873 K before and after CVD are listed in Tables 5 and 6.

TABLE 5

Gas permeation properties of composite membrane 55-55-55-55

| Permeation properties | | Membrane substrate 55-55-55-55 | 3 hr-$SiO_2$ | 6 hr-$SiO_2$ |
|---|---|---|---|---|
| Permeance (mol/m² s Pa) | $H_2$ | $4.8 \times 10^{-5}$ | $1.1 \times 10^{-6}$ | $9.4 \times 10^{-7}$ |
| | $CH_4$ | $1.8 \times 10^{-5}$ | $4.1 \times 10^{-7}$ | $3.1 \times 10^{-7}$ |
| | $CO_2$ | $1.1 \times 10^{-5}$ | $3.2 \times 10^{-7}$ | $2.0 \times 10^{-7}$ |
| Selectivity | $H_2/CH_4$ | 2.7 | 2.7 | 3.0 |
| | $H_2/CO_2$ | 4.4 | 4.7 | 4.7 |

TABLE 6

Gas permeation properties of composite membrane 630-630-630-630

| Permeation properties | | Membrane substrate 630-630-630-630 | 3 hr-$SiO_2$ | 6 hr-$SiO_2$ |
|---|---|---|---|---|
| Permeance (mol/m² s Pa) | $H_2$ | $6.9 \times 10^{-5}$ | $1.6 \times 10^{-6}$ | $4.6 \times 10^{-7}$ |
| | $CH_4$ | $2.6 \times 10^{-5}$ | $4.8 \times 10^{-7}$ | $6.9 \times 10^{-8}$ |
| | $CO_2$ | $1.5 \times 10^{-5}$ | $3.0 \times 10^{-7}$ | $3.3 \times 10^{-8}$ |
| Selectivity | $H_2/CH_4$ | 2.7 | 3.3 | 6.7 |
| | $H_2/CO_2$ | 4.6 | 5.3 | 14 |

Looking at Tables 5 and 6, the selectivities of $H_2$ over $CH_4$ and $CO_2$ for the substrate membrane with intermediate layers of gamma-alumina are close to the values predicated by the Knudsen diffusion mechanism. For example, after 3 hours and 6 hours of CVD, the permeabilities declined slightly while the selectivities increased slightly. In contrast, the $H_2$ permeance was high, $9.4 \times 10^{-7}$ mol $Pa^{-1}$ $s^{-1}$ $m^{-2}$.

Example 8

This example describes the preparation of a silica membrane utilizing a membrane substrate with four multiple graded layers. The membrane consists of a thin silica layer deposited by CVD on top of a membrane substrate obtained in Example 6 (i.e. using dipping solutions DS630, DS630, DS200 and DS40). A silica layer was deposited on an intermediate gamma-alumina layer, which was obtained by sequentially dipping-calcining sols with particle size of 603, 630, 200 and 40 nm.

The silica layer was deposited by the CVD of TEOS at high temperature as described in U.S. Pat. No. 6,527,833, in a similar manner as in Example 7. The CVD process was conducted for 5 hours with the process parameters listed in Table 2. The permeation properties of the resulting membrane at 873 K before and after CVD are listed in Table 7 and are graphically shown in FIG. 9.

TABLE 7

Gas permeation properties of composite membrane 630-630-200-40

| Permeation properties | | Membrane substrate 630-630-200-40 | 5 hr-$SiO_2$ |
|---|---|---|---|
| Permeance (mol/m² s Pa) | $H_2$ | $5.9 \times 10^{-5}$ | $1.9 \times 10^{-7}$ |
| | $CH_4$ | $2.2 \times 10^{-5}$ | $2.9 \times 10^{-10}$ |
| | $CO$ | $1.7 \times 10^{-5}$ | $3.2 \times 10^{-10}$ |
| | $CO_2$ | $1.3 \times 10^{-5}$ | $3.5 \times 10^{-10}$ |
| Selectivity | $H_2/CH_4$ | 2.7 | 660 |
| | $H_2/CO$ | 3.5 | 590 |
| | $H_2/CO_2$ | 4.5 | 540 |

Looking at Table 7, the selectivities of the membrane increased rapidly with the deposition time. For example, after 5 hours of deposition, the selectivities of $H_2$ over $CH_4$, CO and $CO_2$ were 660, 590 and 540, respectively at 873 K. Also, the $H_2$ permeance was $1.9 \times 10^7$ mol $Pa^{-1}$ $s^{-1}$ $m^{-2}$, clearly superior to that with the ungraded substrates of Examples 6 and 7.

Example 9

This example describes the preparation of another silica membrane prepared using a membrane substrate with five graded layers. The membrane had a thin silica surface layer deposited by CVD, similarly to Examples 7 and 8. A silica layer was deposited on an intermediate gamma-alumina layer, which was obtained by sequentially dipping-calcining sols with particle size of 630, 630, 200, 40 and 40 nm.

The substrate in this case was one of the membrane substrates described in Example 6 which had five graded layers of different particle-sized gamma-alumina on a porous alumina tube (i.e. using sequentially dipping solutions DS630, DS630, DS200, DS40 and DS40). The CVD of TEOS was conducted for 3 hours with the process parameters listed in Table 2. The permeation properties of the resulting membrane at 873 K before and after CVD are listed in Table 8 and graphically shown in FIG. 10.

TABLE 8

Gas permeation properties of composite
membrane 630-630-200-40-40

| Permeation properties | | Membrane substrate 630-630-200-40-40 | 3 hr-$SiO_2$ |
|---|---|---|---|
| Permeance ($mol/m^2$ s Pa) | $H_2$ | $4.5 \times 10^{-5}$ | $4.9 \times 10^{-7}$ |
| | $CH_4$ | $1.6 \times 10^{-5}$ | $8.3 \times 10^{-11}$ |
| | CO | $1.2 \times 10^{-5}$ | $9.6 \times 10^{-11}$ |
| | $CO_2$ | $9.1 \times 10^{-6}$ | $3.2 \times 10^{-10}$ |
| Selectivity | $H_2/CH_4$ | 2.8 | 5900 |
| | $H_2/CO$ | 3.7 | 5100 |
| | $H_2/CO_2$ | 4.9 | 1500 |

Looking at Table 8, the selectivities of the membrane increased quickly after the deposition. For example, after 3 hours of deposition, the selectivities of $H_2$ over $CH_4$, CO and $CO_2$ were 5900, 5100 and 1500, respectively at 873 K. The $H_2$ permeance was $4.9 \times 10^{-7}$ mol $m^{-2}$ $s^{-1}$ $Pa^{-1}$, which was significantly better than that of the four-layer graded substrate of Example 8.

Example 10

This example illustrates the unique permeability properties of a silica membrane using graded substrates in accordance with a preferred embodiment of this invention. A composite membrane with a five-layer substrate similar to the one described in Example 9 was prepared with freshly synthesized sols as described in Examples 1 and 2. The median particle sizes of the sols were 630, 630, 200, 40, and 40 nm, producing membrane 630-630-200-40-40.

The permeability of the membrane for He, $H_2$, and Ne was measured and the results are presented in FIG. 11. In FIG. 11, the permeability of the membrane rises with temperature, as expected. The almost complete exclusion of $CO_2$, CO, and $CH_4$ (Table 8) can be understood from the large size (>0.3 nm) of these species (see Table 9).

TABLE 9

Size and weight of permeating species

| Species | Size/nm | Weight/atomic units |
|---|---|---|
| He | 0.260 | 4 |
| Ne | 0.275 | 20 |
| $H_2$ | 0.289 | 2 |
| $CO_2$ | 0.33 | 44 |
| CO | 0.376 | 28 |
| $CH_4$ | 0.38 | 16 |

Looking still at FIG. 11, the permeation properties of the membrane appear to be those of the silica layer, as it was already demonstrated that the porous substrate permitted the permeation of the larger species in Examples 7–9.

However, the order of permeability, He>$H_2$>Ne, is unexpected because it follows neither the size nor weight of the species; generally, porous materials allow faster passage of smaller species or lighter species. Comparing Table 9 with FIG. 11, He is heavier than $H_2$, yet permeates faster. Ne is smaller than $H_2$, yet permeates slower. Without wishing to be bound by any particular theory, the order and behavior of the species appears to be explained by a solubility site mechanism for permeation originally derived to describe permeation in vitreous glasses (J. S. Masaryk, R. M. Fulrath, J. Chem. Phys. 59 (1973) 1198). The governing equation for the solubility site mechanism is:

$$Q = \frac{1}{6L}\left(\frac{d^2}{h}\right)\left(\frac{h^2}{2\pi mkT}\right)^{\frac{3}{2}} \frac{(N_S/N_A)}{(e^{hv^*/2kT} - e^{-hv^*/2kT})^2} e^{-\Delta E_K/RT} \quad [4]$$

In Equation 4, Q=permeability, L=membrane thickness, d=jump distance, h=Planck's constant, m=mass of permeating species, k=Boltzmann constant, T=absolute temperature, Ns=number of solubility sites, $N_A$=Avogadro's number, v=jump frequency, $\Delta E_K$=activation energy, R=gas constant. The equation above is simplified in that it does not consider loss of rotation of the hydrogen molecule. The calculated curves, assuming a jump distance of 0.8 μm, fit the experimental points very well (FIG. 14). The calculated parameters are summarized in Table 10.

TABLE 10

Calculated Parameters for Composite
Membrane 540-540-170-40-40

| Gases | Kinetic Diameter (nm) | $N_s$ (sites $m^{-3}$) | $v^*$ ($s^{-1}$) | $E_a$ (kJ $mol^{-1}$) |
|---|---|---|---|---|
| He | 0.26 | $6.79 \times 10^{26}$ | $8.59 \times 10^{12}$ | 4.07 |
| $H_2$ | 0.289 | $4.01 \times 10^{26}$ | $1.13 \times 10^{13}$ | 8.90 |
| Ne | 0.275 | $5.00 \times 10^{26}$ | $4.40 \times 10^{12}$ | 8.75 |

Generally, the number of solubility sites is larger for the smaller species, as on the average there will be more sites available to accommodate smaller sized species. The jump frequencies are inversely proportional to the molecular weight of the species, as lighter species vibrate faster in their equilibrium sites. The size of the solubility sites of the silica layer is smaller than 0.3 nm, because $CO_2$, CO and $CH_4$ do not permeate. Thus, the silica layer limits the permeation of the membrane to species smaller than 0.3 nm.

The results obtained can be compared to values for vitreous glass where the jump distance is 0.3 nm, shown in Table 11.

TABLE 11

Parameters for Vitreous Glass

| Gases | $N_s$ (sites $m^{-3}$) | $v^*$ ($s^{-1}$) | $E_a$ (kJ $mol^{-1}$) |
|---|---|---|---|
| He | $2.22 \times 10^{27}$ | $6.90 \times 10^{12}$ | 17.8–21.1 |
| $H_2$ | $1.07 \times 10^{27}$ | $1.22 \times 10^{13}$ | 37.2–38.3 |
| Ne | $1.30 \times 10^{27}$ | $4.38 \times 10^{12}$ | 33.8–39.5 |

Compared to vitreous glass, the number of solubility sites in composite membrane 540-540-170-40-40 are smaller, consistent with the larger jump distance and a more open structure. The jump frequencies are similar, indicating a similar environment as in vitreous glass. The activation energies in the membrane are considerably smaller, again indicating that the structure of the silica is more open and less restrictive than that of the vitreous glass.

Low- and high-resolution electron micrographs of an exemplary five-layer composite membrane 630-630-200-40-40 exhibit the properties described herein. In a low-resolution micrograph, the bottom portion of the micrograph shows the coarse structure of the porous support, while the top portion shows the 5-layer substrate. The boundaries between layers are not discernible, partly because only 3 sol sizes (630, 200, 40) were used. Close inspection shows the particles at the top are smaller than those at the bottom.

A high-resolution micrograph of the same membrane shows the topmost part of the membrane formed by the sols of size 40 nm. Careful examination reveals a thin layer at the very top with a slightly different contrast than the alumina particles. This is the silica layer, of thickness 10–20 nm.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, while the sol solution was described as being applied to a support via dipping, it is contemplated that any method of coating, including, but not limited to, painting, spraying, rolling, etc., may be used.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. Use of the term "optional" with respect to any element of a claim is intended to mean that the subject element is required, or alternatively, is not required. Both alternatives are intended to be within the scope of the claim. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A permselective membrane assembly comprising a porous, graded particulate layer, wherein the porous, graded particulate layer is prepared from a plurality of sols having narrow particle size distributions.

2. The permselective membrane assembly of claim 1, further comprising a porous support and a permselective membrane.

3. The permselective membrane assembly of claim 2 wherein the porous support is selected from the group consisting of alumina, titania, silica, zirconia, perovskites, spinels, pyrochlores, zeolites, stainless steel, and combinations thereof.

4. The permselective membrane assembly of claim 3 wherein the porous support comprises alumina.

5. The permselective membrane assembly of claim 2 wherein the permselective membrane is deposited by CVD.

6. The permselective membrane assembly of claim 2 wherein the permselective membrane comprises silica.

7. The permselective membrane assembly of claim 2 wherein the permselective membrane comprises nanosil.

8. The permselective membrane assembly of claim 1 wherein the permeance to hydrogen gas is at least $1 \times 10^{-7}$ mol/m$^2$ s Pa and the hydrogen permselectivities with respect to carbon dioxide, carbon monoxide and methane are each at least 100.

9. The permselective membrane assembly of claim 1 wherein the permeance to hydrogen gas is at least $4 \times 10^{-7}$ mol/m$^2$ s Pa and the hydrogen permselectivities with respect to carbon dioxide, carbon monoxide and methane are each at least 1000.

10. The permselective membrane of claim 1 wherein at least one of the sols has an average particle size of greater than 500 nm and at least one of the sols has an average particle size less than 100 nm.

11. The permselective membrane of claim 1 wherein the plurality of sols are comprised of alumina particles.

12. The permselective membrane of claim 1 wherein at least one of the plurality of sols comprises a boehmite sol and a binder-containing solution and wherein the boehmite sol is produced by a method comprising:
hydrolyzing an aluminum-containing precursor at conditions sufficient to form an aluminum-containing intermediate;
peptizing the aluminum-containing intermediate with an acid at conditions sufficient to form a colloid; and
aging the colloid at conditions sufficient to form the sol.

13. The permselective membrane of claim 1 wherein the porous, graded particulate layer has a thickness in the range of 200 nm and 2,000 nm.

14. The permselective membrane of claim 1 wherein the porous, graded particulate layer has a thickness in the range of 400 nm and 1,800 nm.

15. The permselective membrane of claim 1 wherein the porous, graded particulate layer has a thickness in the range of 500 nm and 1,500 nm.

16. The permselective membrane of claim 1, further including a silica layer on said porous, graded particulate layer.

17. A method for promoting the yield of a gaseous reaction product by selective permeation using a permselective membrane assembly comprising a porous, graded particulate layer, wherein the porous, graded articulate layer is prepared from a plurality of sols having narrow particle size distributions.

18. The method of claim 17 wherein the gaseous reaction product is hydrogen.

* * * * *

UNITED STATES PATENT AND TRADEMARK OFFICE
CERTIFICATE OF CORRECTION

| | | |
|---|---|---|
| PATENT NO. | : 7,179,325 B2 | Page 1 of 1 |
| APPLICATION NO. | : 10/775288 | |
| DATED | : February 20, 2007 | |
| INVENTOR(S) | : Shigeo Ted Oyama, Yunfeng Gu and Doohwan Lee | |

It is certified that error appears in the above-identified patent and that said Letters Patent is hereby corrected as shown below:

Column 7, line 18 - please delete "203" and insert --230--

Signed and Sealed this

Seventeenth Day of April, 2007

JON W. DUDAS
*Director of the United States Patent and Trademark Office*